United States Patent
Abedini et al.

(10) Patent No.: US 12,082,107 B2
(45) Date of Patent: Sep. 3, 2024

(54) LEVERAGING INTEGRATED ACCESS AND BACKHAUL (IAB) RESOURCE MANAGEMENT FOR POWER SAVINGS IN A WIRELESS COMMUNICATION NETWORK

(71) Applicant: QUALCOMM Incorporated, San Diego, CA (US)

(72) Inventors: Navid Abedini, Basking Ridge, NJ (US); Jianghong Luo, Skillman, NJ (US); Naeem Akl, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 17/525,768

(22) Filed: Nov. 12, 2021

(65) Prior Publication Data
US 2023/0156591 A1   May 18, 2023

(51) Int. Cl.
*H04W 52/02* (2009.01)
*H04W 72/044* (2023.01)
*H04W 72/0446* (2023.01)
*H04W 72/0453* (2023.01)
*H04W 72/27* (2023.01)
*H04W 88/14* (2009.01)

(52) U.S. Cl.
CPC ... *H04W 52/0206* (2013.01); *H04W 72/0446* (2013.01); *H04W 72/0453* (2013.01); *H04W 72/046* (2013.01); *H04W 72/27* (2023.01); *H04W 88/14* (2013.01)

(58) Field of Classification Search
None
See application file for complete search history.

(56) References Cited

U.S. PATENT DOCUMENTS

| 2008/0014938 A1* | 1/2008 | Hart | H04W 76/20 455/435.1 |
| 2015/0327265 A1* | 11/2015 | Lee | H04W 72/541 370/315 |

(Continued)

OTHER PUBLICATIONS

International Search Report and Written Opinion—PCT/US2022/079215—ISA/EPO—Feb. 22, 2023 (2103833WO).

*Primary Examiner* — The Hy Nguyen
(74) *Attorney, Agent, or Firm* — Holland & Hart LLP

(57) ABSTRACT

This disclosure provides systems, methods, and apparatus, including computer programs encoded on computer-readable media, for leveraging a resource management protocol under an integrated access and backhaul (IAB) framework for power savings. In some aspects, a first node (such as an IAB node) may receive resource management information from a second node (such as an IAB donor). The resource management information may indicate an unavailable type of resource management configuration for the first resource associated with the first node. The first node may schedule a power save mode during the first resource having the unavailable type of resource management configuration for power savings. The first resource may be a time domain resource, a frequency domain resource, or a spatial domain resource. In some aspects, the first node may restrict both non-exempt and exempt communications during the first resource when the first node is in the power save mode.

26 Claims, 9 Drawing Sheets

(56) References Cited

U.S. PATENT DOCUMENTS

2020/0100179 A1\* 3/2020 Zhou ................. H04W 52/0216
2020/0337048 A1\* 10/2020 Abedini ................ H04L 5/0044
2021/0076326 A1\* 3/2021 Akl ................... H04W 52/0206

\* cited by examiner

LEVERAGING INTEGRATED ACCESS AND BACKHAUL (IAB) RESOURCE MANAGEMENT FOR POWER SAVINGS IN A WIRELESS COMMUNICATION NETWORK

TECHNICAL FIELD

Aspects of the present disclosure relate generally to wireless communication and to techniques for leveraging resource management information for power saving in a wireless communication network.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the $3^{rd}$ generation (3G) and $4^{th}$ generation (4G, including long term evolution (LTE)) technologies to a next generation new radio (NR) technology, which may be referred to as $5^{th}$ Generation (5G) or 5G NR. For example, NR is designed to provide a lower latency, a higher bandwidth or a higher throughput, and a higher reliability than 3G or LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Wireless communication networks may support some combination of 2G, 3G, LTE, and 5G NR technologies. A UE may communicate with the wireless communication network using one or more of the 2G, 3G, LTE, and 5G NR technologies. For example, the UE may use 5G NR for some applications, such as data transmissions, and may use LTE for other applications, such as voice transmissions. A UE also may have access to wireless local area networks (WLANs) in the wireless communication network.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method performed by a first node of a wireless communication network. The method may include receiving, from a second node of the wireless communication network, resource management information for one or more resources associated with the first node. The resource management information may indicate a first resource management configuration for a first resource of the one or more resources. The method may include scheduling a power save mode for the first node associated with the first resource and the first resource management configuration.

In some implementations, the first node may be a first IAB node, a first gNB, a first CU, a first DU, a child IAB node, or a UE, and the second node may be a second IAB node, an IAB donor, a second gNB, a second CU, a second DU, or a parent IAB node.

In some implementations, the resource management information may be resource management information under an IAB framework, and the first resource management configuration may be a first resource management configuration under the IAB framework. The first resource management configuration may indicate an unavailable type of resource management configuration for the first resource.

In some implementations, the first resource may be a time domain resource, a frequency domain resource, or a spatial domain resource.

In some implementations, if the first resource is a time domain resource, the method of scheduling the power save mode for the first node associated with the first resource and the first resource management configuration may include scheduling the power save mode associated with the first resource management configuration during a first time slot associated with the time domain resource. If the first resource is a frequency domain resource, the method of scheduling the power save mode for the first node associated with the first resource and the first resource management configuration may include scheduling the power save mode associated with the first resource management configuration during a first RB associated with the frequency domain resource. If the first resource is a spatial domain resource, the method of scheduling the power save mode for the first node associated with the first resource and the first resource management configuration may include scheduling the power save mode associated with the first resource management configuration in a first spatial direction associated with the spatial domain resource.

In some implementations, the method may further include transmitting a capability indication to the second node indicating the first node supports resource management configurations under an IAB framework and supports a power save mode associated with the first resource management configuration.

Another innovative aspect of the subject matter described in this disclosure can be implemented in a first node of a wireless communication network. The first node may include one or more processors and one or more interfaces. The one or more interfaces may be configured to receive resource management information for one or more resources associated with the first node. The resource management information may indicate a first resource management configuration for a first resource of the one or more resources. The one or more processors may be configured to schedule a power save mode for the first node associated with the first resource and the first resource management configuration.

Another innovative aspect of the subject matter described in this disclosure can be implemented in a non-transitory computer-readable medium having stored therein instructions which, when executed by a processor of a first node, cause the first node to receive, from a second node of a wireless communication network, resource management information for one or more resources associated with the first node, the resource management information indicating a first resource management configuration for a first resource of the one or more resources, and schedule a power save mode for the first node associated with the first resource and the first resource management configuration.

Another innovative aspect of the subject matter described in this disclosure can be implemented in a first node of a wireless communication network. The first node may include means for receiving, from a second node of the wireless communication network, resource management information for one or more resources associated with the first node. The resource management information may indicate a first resource management configuration for a first resource of the one or more resources. The first node may include means for scheduling a power save mode for the first node associated with the first resource and the first resource management configuration.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
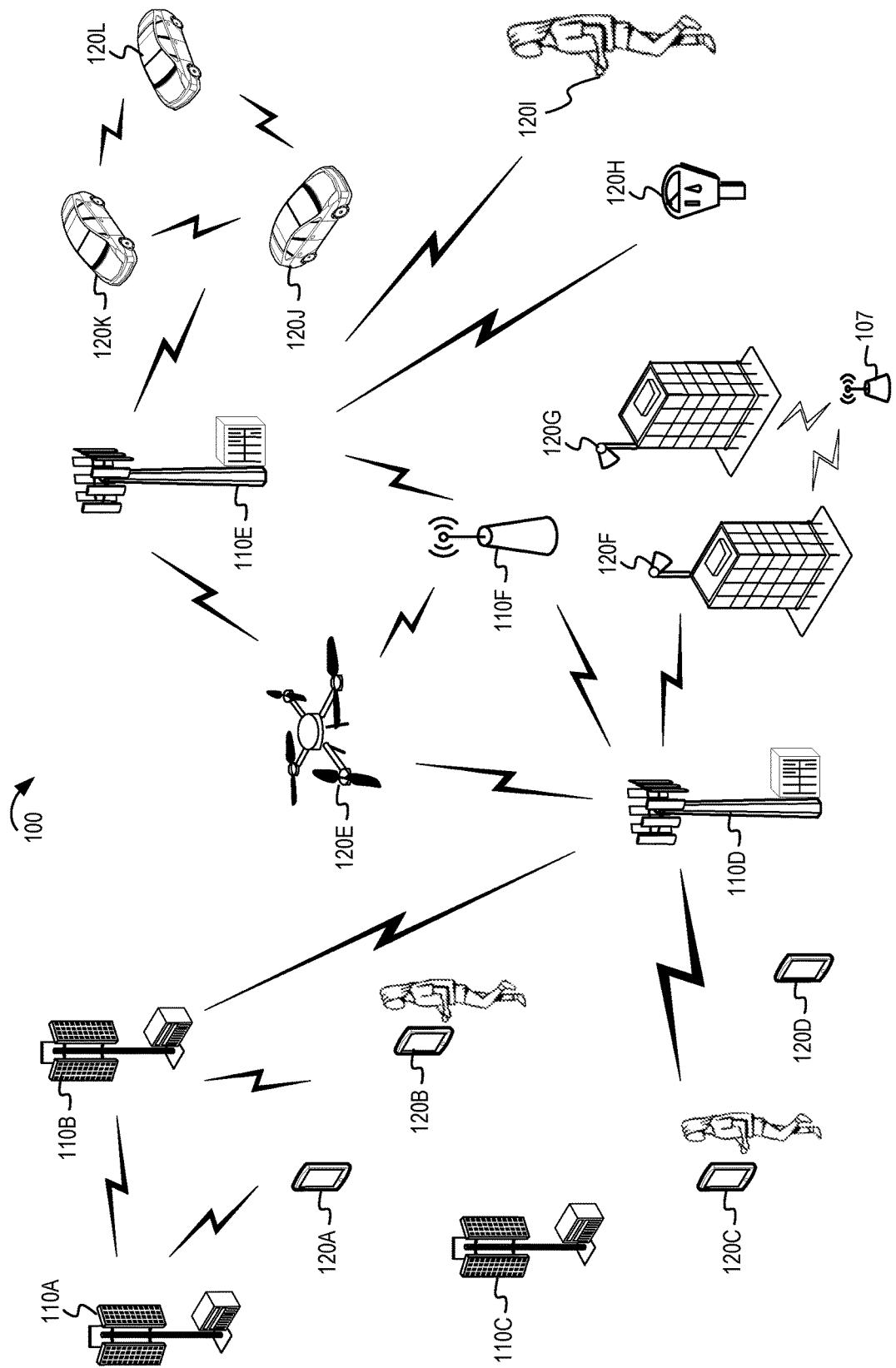
FIG. 1 is a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

A wireless communication network (which also may be referred to as a wireless WAN or WWAN) may include base stations (BSs) that implement a 5G NR radio access technology (RAT) of a 5G NR network and BSs that implement an LTE RAT of an LTE network. The RATs of a WWAN also may be referred to as WWAN RATs. A user equipment (UE) of the wireless communication network may use the 5G NR RAT or the LTE RAT depending on which wireless coverage is available to the UE and which wireless coverage provides the best quality service. BSs may refer to both monolithic BSs, as well as disaggregated BSs, such as those with disaggregated RAN (D-RAN) or open RAN (O-RAN) architectures, which may include one or more disaggregated constituent components, such as a central unit (CU), one or more distributed units (DUs), and one or more radio unit (RUs).

In some aspects, a first node of the wireless communication network may be an integrated access and backhaul (IAB) donor that may include a CU and a DU. A second node may be a first IAB node that may include a first mobile termination (MT) function and a first DU. A third node may be a second IAB node that may include a second MT and a second DU. The first node, the second node, and the third node may implement a resource management protocol under an IAB framework, as defined by the 3GPP technical specification (TS) and further described herein. The first node, the second node, and the third node may have a disaggregated architecture, where the second node (such as the first IAB node) and the third node (such as the second IAB node) are wirelessly connected to the first node (such as the IAB donor) to extend the coverage of the wireless communication network. For example, the disaggregated architecture may extend the coverage of the wireless communication network into geographic areas that are not feasible or cost effective to have wired connections.

In some aspects, an IAB donor may function as a parent node to the first IAB node and the second IAB node for the resource management protocol under the IAB framework. Under the resource management protocol, an IAB donor may provide resource management information to one or more IAB nodes to configure resources associated with each of the IAB nodes. For example, the first node may provide resource management information to the second node and the third node that indicates resource management configurations for the resources associated with the second node and the third node, respectively. The resource management information received by the second node and the third node also may include resource management configurations for neighbor nodes and child nodes. The resources associated with the second node and the third node may include one or more of time domain resources (such as time slots), frequency domain resources (such as resource blocks (RBs)), and spatial domain resources (such as spatial directions).

Under the resource management protocol associated with the IAB framework, the resource management configurations may include an "unavailable" type of resource management configuration, a "hard" type of resource management configuration, and a "soft" type of resource management configuration. When a resource associated with an IAB node (such as the second node) is configured to be an unavailable type, the IAB node may not use the resource to transmit or receive. When a resource associated with an IAB node is configured to be a hard type, the IAB node may use that resource to transmit, receive, or both transmit and receive. When a resource associated with an IAB node is configured to be a soft type, the resource may be conditionally available to the IAB node to transmit, receive, or both transmit and receive, depending on whether the conditions are met. According to the resource management protocol under the IAB framework, some critical or time sensitive communications may be exempt from the conditions of the soft type of configuration and the restrictions of the unavailable type of configuration. Example communications that may be exempt may include transmissions of SSB or PBCH block communications, transmission of certain PDCCH communications, transmission of CSI-RSs, or reception of PRACH or SR communications.

In some implementations, the second node (such as the first IAB node) and the third node (such as the second IAB node) may leverage the resource management protocol under the IAB framework for power savings. For example, the second node may enter a power save mode based on the resource management configurations received from the first node. The second node may save power by reducing the resources that are active and communicating during the power save mode. In some implementations, when the first node configures a first resource associated with the first node with the unavailable type of resource management configuration, the second node may use that period of inactivity configured by the resource management protocol to enter a power save mode during the first resource to improve power savings.

Non-IAB nodes, such as gNBs, and UEs typically do not support the resource management protocol under the IAB framework. In some implementations, when the second node is a gNB or another type of non-IAB node, the second node may be configured to transmit a capability indication to the first node indicating whether the second node supports leveraging the resource management configurations under the IAB framework for power savings. The capability indication may indicate the second node (which may be a non-IAB node) supports scheduling a power save mode associated with the resource management configurations. Similarly, in some implementations, a UE may be configured to transmit a capability indication to the second node indicating the UE supports leveraging the resource management configurations under the IAB framework for power savings. When the non-IAB node and the UE receive a resource management configuration indicating an unavailable type of configuration for a first resource, the non-IAB node and the UE may schedule a power save mode for the first resource.

In some implementations, the second node and the third node may leverage resource management configurations associated with one or more neighbor nodes that are shared among neighbor nodes to implement coordinated power savings in the wireless communication network. The neighbor nodes may be any other type of node, such as another IAB node, a parent node, a child node, a gNB (such as a non-IAB node), a UE, among others. In some implementations, the second node may receive resource management information that includes resource management configurations for one or more resources associated with the second node and resource management configurations associated with one or more neighbor nodes (such as the third node). The second node may schedule a power save mode associated with the resource management configurations for the second node and the resource management configurations for the one or more neighbor node. In some implementations, gNBs, non-IAB nodes, and UEs may be configured to leverage the resource management configurations shared by neighbor nodes for power savings. For example, a non-IAB node may receive resource management information that includes resource management configurations for one or more resources associated with the non-IAB node and resource management configurations associated with one or more neighbor nodes (such as the second node). The non-IAB node may schedule a power save mode associated with the resource management configurations for the non-IAB node and the resource management configurations for the one or more neighbor nodes.

In some implementations, the second node or the third node may override the exemption of certain communications that are exempt from the resource management configurations. In some implementations, the second node and the third node may implement signaling that indicates whether each of the nodes is overriding the exemption of the exempt communications or supports the exemption of the exempt communications. For example, the second node may provide dynamic or semi-static indications that indicate whether the second node is overriding the exemption of the exempt communications or supports the exemption of the exempt communications. In some implementations, the first node may instruct or configure the second node to override one or more exempt communications. In some implementations, the first node may suggest the second node to override one or more exempt communications, but the second node may decide whether or not to implement the suggestion. In some implementations, similar to the indication of whether the exemption of certain exempt communications is being overridden during certain resources, the second node and the third node may indicate whether the exemption of certain exempt communications during guard symbols is being overridden.

Particular implementations of the subject matter described in this disclosure can be implemented to realize one or more of the following potential advantages. Leveraging the resource management protocol under the IAB framework for power savings may improve power savings in a wireless communication network. Nodes of the wireless network may save additional power by reducing the resources (such as resources in the time domain, frequency domain, and spatial domain) that are active and communicating based on the resource management protocol. Also, the nodes of the network may implement coordinated power saving in the wireless communication network by sharing resource management configurations across most or all of the nodes of the wireless communication network including non-IAB nodes and UEs. Improving the power savings and power consumption at the nodes of the wireless communication network may improve the overall performance of the wireless communication network and improve the user experience.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 includes a number of base stations (BSs) 110 (individually labeled as 110A, 110B, 110C, 110D, 110E, and 110F) and other network entities. A BS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP the term "cell" can refer to this particular geographic coverage area of a BS 110 or a BS subsystem serving the coverage area, depending on the context in which the term is used.

ABS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. A BS 110 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a terminal, a mobile station, a wireless device, a subscriber unit, a station, or the like. A UE 120 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (CoMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C and 120D. Such multicast services may include mobile television or stream video, or may include other services for providing community information, such as weather emergencies or alerts, such as Amber alerts or gray alerts.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 120I (such as a wearable device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 120I

(such as a wearable device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L. Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell-specific reference signals (CRSs) or channel state information reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

Figure 2:
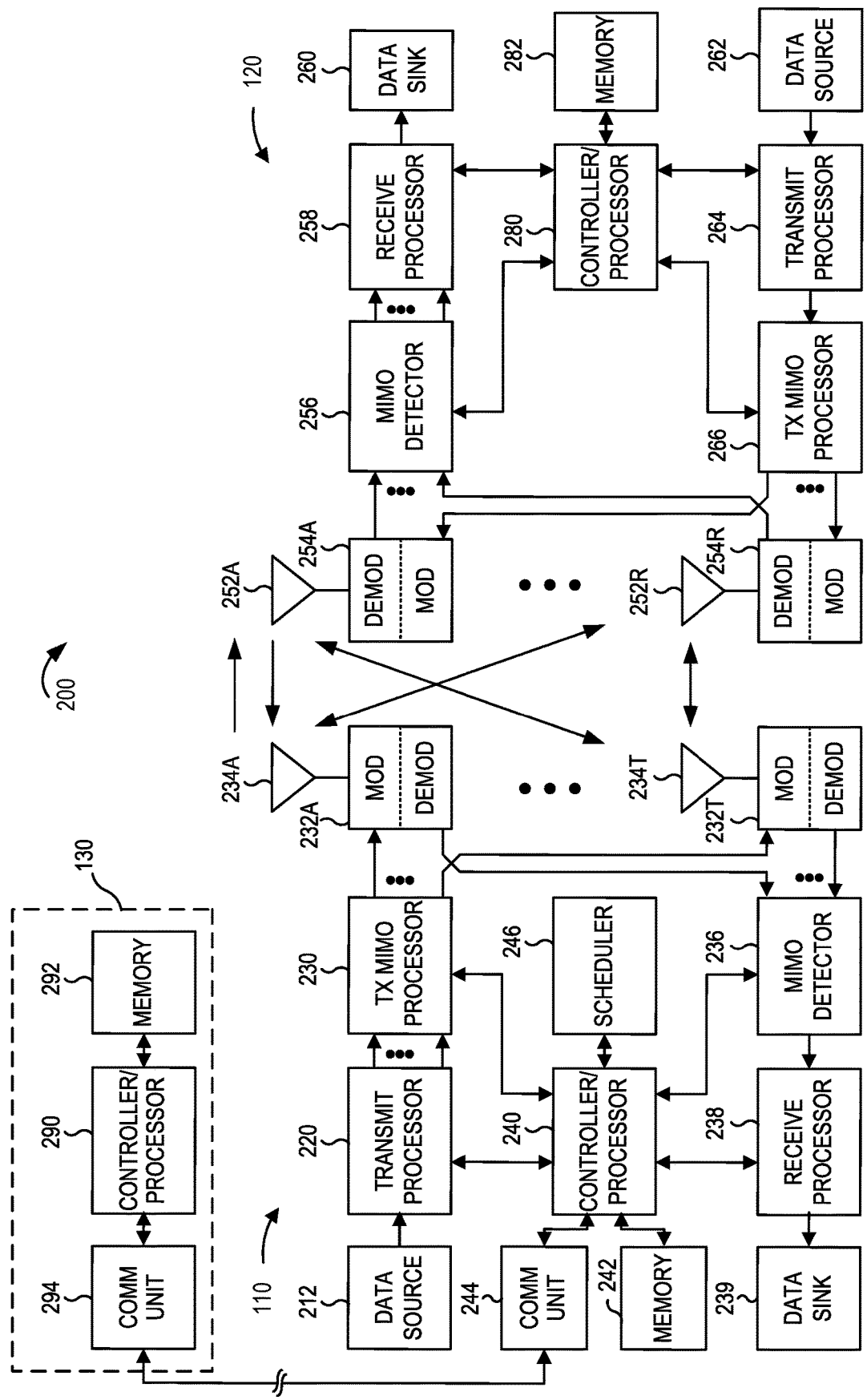
FIG. 2 is a block diagram conceptually illustrating an example of a base station (BS) in communication with a user equipment (UE).

FIG. 2 is a block diagram conceptually illustrating an example 200 of a BS 110 in communication with a UE 120. In some aspects, BS 110 and UE 120 may respectively be one of the BSs and one of the UEs in wireless communication network 100 of FIG. 1. BS 110 may be equipped with T antennas 234A through 234T, and UE 120 may be equipped with R antennas 252A through 252R, where in general $T \geq 1$ and $R \geq 1$.

At BS 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from BS 110 or other BSs and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to BS 110. At BS 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The BS 110 may include communication unit 244 and may communicate to network controller 130 via communication unit 244. The network controller 130 may include communication unit 294, a controller or processor (i.e., controller/processor) 290, and memory 292.

The controller/processor 240 of BS 110, the controller/processor 280 of UE 120, or any other component(s) of FIG. 2 may perform one or more techniques associated with leveraging resource management information for power saving in a wireless communication network, as described in more detail elsewhere herein. For example, the controller/processor 240 of BS 110, the controller/processor 280 of UE 120, or any other component(s) (or combinations of components) of FIG. 2 may perform or direct operations of, for example, the process depicted by flowchart 700 of FIG. 7 or other processes as described herein, such as the processes described in FIGS. 3-6. The memories 242 and 282 may store data and program codes for BS 110 and UE 120, respectively. A scheduler 246 may schedule UEs for data transmission on the downlink, the uplink, or a combination thereof.

Figure 5:
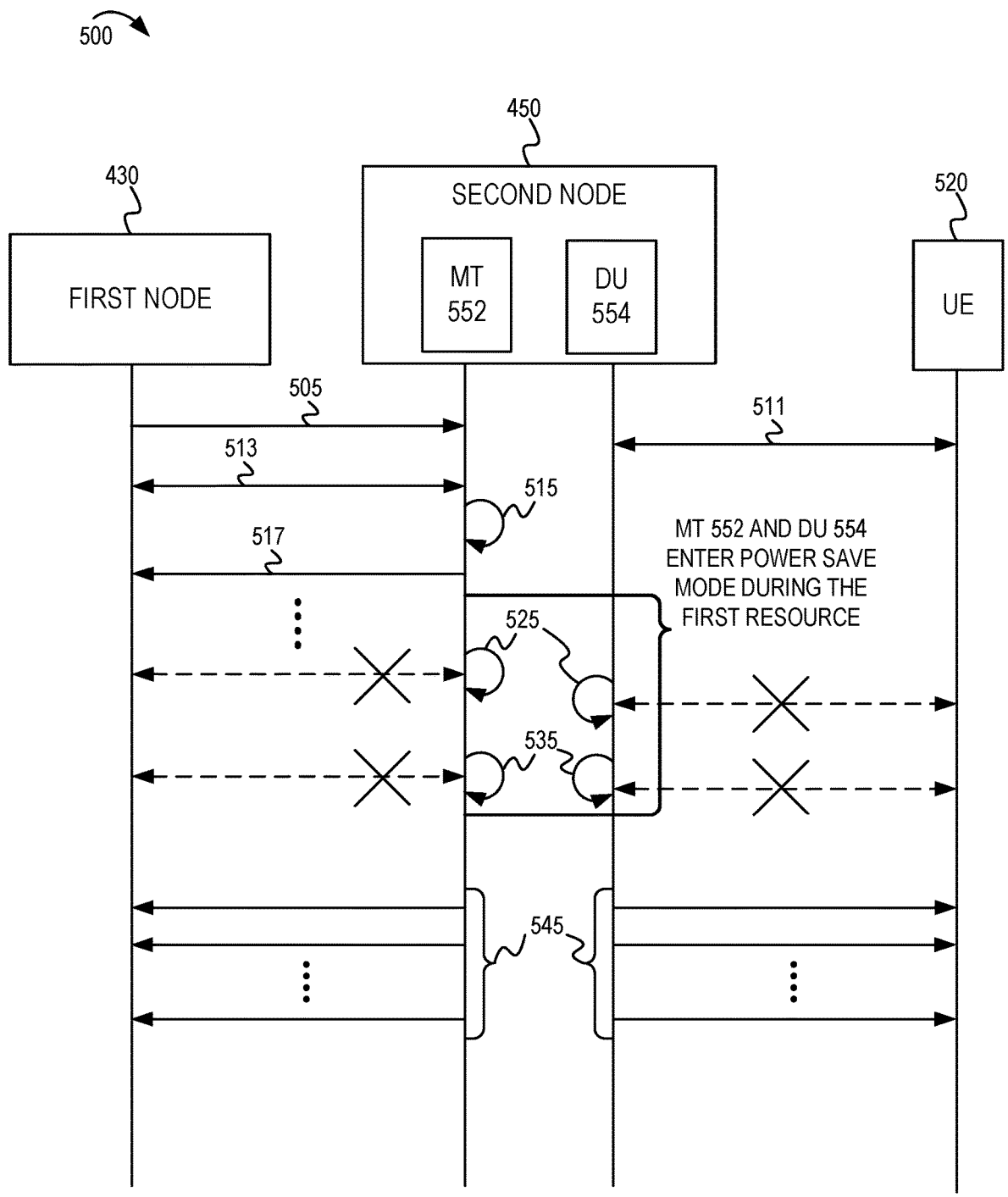
FIG. 5 shows an example message flow between a first node, a second node and a UE of a wireless communication network that are configured to leverage resource management configurations under an IAB framework for power savings.
Figure 6:
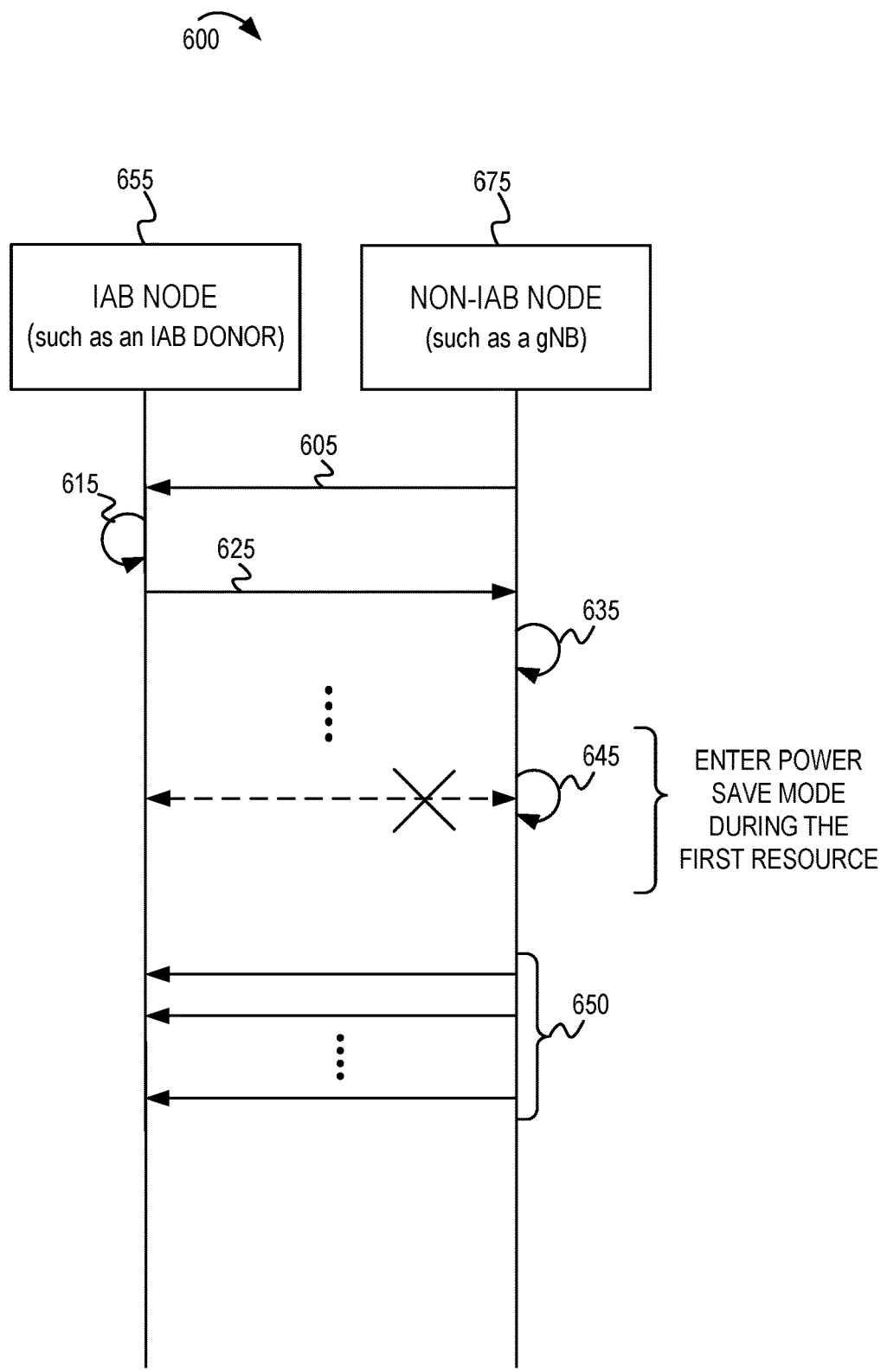
FIG. 6 shows an example message flow between an IAB node and a non-IAB node of a wireless communication network that are configured to leverage resource management configurations under an IAB framework for power savings.
Figure 7:
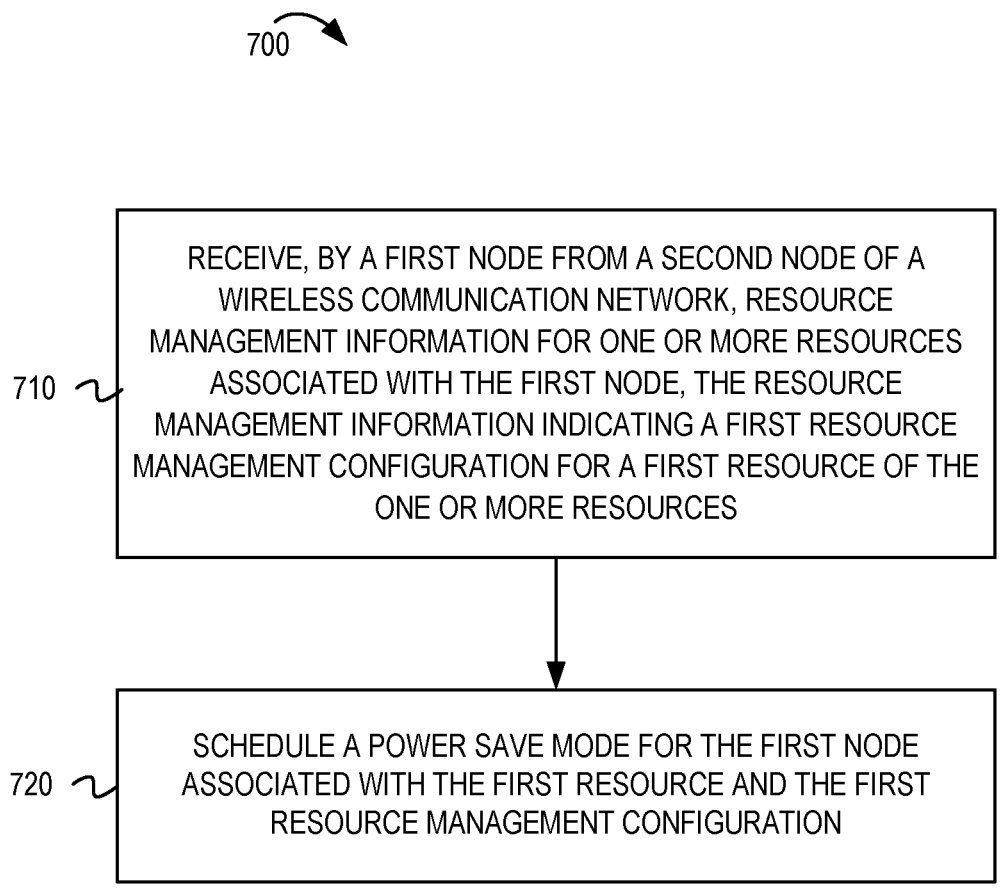
FIG. 7 depicts a flowchart with example operations performed by a first node of a wireless communication network to leverage resource management configurations under an IAB framework for power savings.

The stored program codes, when executed by the controller/processor 280 or other processors and modules at UE 120, may cause the UE 120 to perform operations described with respect to the process depicted by flowchart 700 of FIG. 7 or other processes as described herein, such as the processes described in FIGS. 3-6. The stored program codes, when executed by the controller/processor 240 or other processors and modules at BS 110, may cause the BS 110 to perform operations described with respect to the process depicted by flowchart 700 of FIG. 7 or other processes as described herein, such as the processes described in FIGS. 3-6. A scheduler 246 may schedule UEs for data transmission on the downlink, the uplink, or a combination thereof.

In some aspects, UE 120 may include means for performing the process depicted by flowchart 700 of FIG. 7 or other processes as described herein, such as the processes described in FIGS. 3-6. In some aspects, such means may include one or more components of UE 120 described in connection with FIG. 2.

In some aspects, BS 110 may include means for performing the process depicted by flowchart 700 of FIG. 7 or other processes as described herein, such as the processes described in FIGS. 3-6. In some aspects, such means may include one or more components of BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
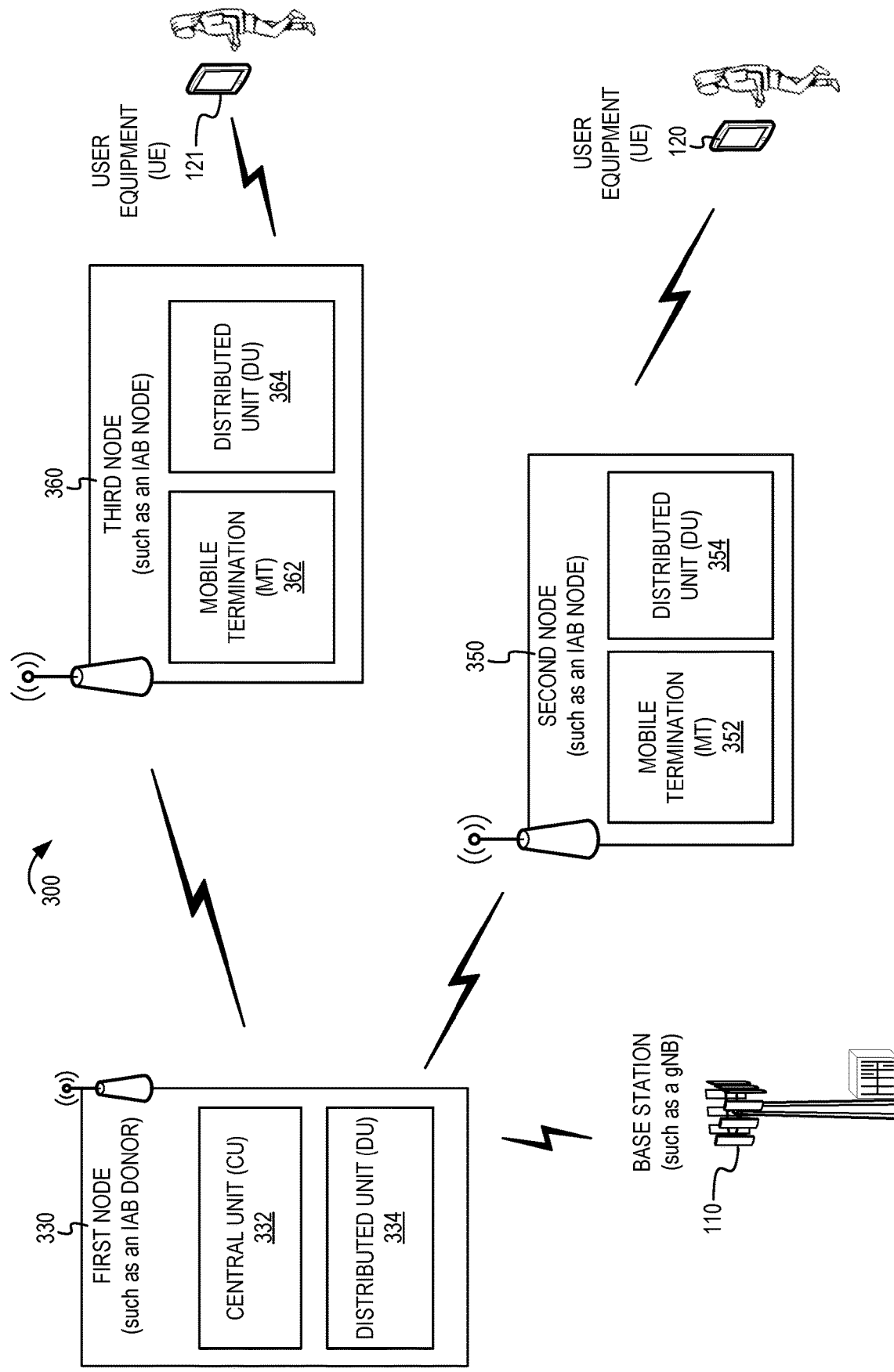
FIG. 3 shows a system diagram of an example wireless communication network that leverages a resource management protocol and configurations under an integrated access and backhaul (IAB) framework for power savings.

FIG. 3 shows a system diagram of an example wireless communication network that leverages a resource management protocol and configurations under an integrated access and backhaul (IAB) framework for power savings. The wireless communication network 300 shown in FIG. 3 can be an implementation of the example wireless communication network 100 described in FIG. 1. The wireless communication network 300 also may be referred to as a wide area network (WAN) or a wireless wide area network (WWAN). The wireless communication network 300 may include one or more nodes or network entities, such as a UE 120, a UE 121, a BS 110, a first node 330, a second node 350, and a third node 360. As shown in FIG. 3, in some implementations, the BS 110 may be a gNB that may implement a 5G NR RAT. The UE 120 and the UE 121 may each be an example implementation of the UEs shown in FIGS. 1 and 2. The BS 110 may be an example implementation of the BSs shown in FIGS. 1 and 2. BSs may refer to both monolithic BSs, as well as disaggregated BSs, such as those with disaggregated RAN (D-RAN) or open RAN (O-RAN) architectures, which may include one or more disaggregated constituent components, such as a CU, one or more DUs, and one or more RUs. In some implementations, as shown in FIG. 3, the first node 330 may be an integrated access and backhaul (IAB) donor (which also may be referred to as an IAB donor node) that may include a CU 332 and a DU 334. While not shown for simplicity, in some implementations, the first node 330 may be a gNB, a CU, a DU, an IAB node, or a combination of a CU and a DU. In some implementations, as shown in FIG. 3, the second node 350 may be an IAB node (which also may be referred to as a first IAB node) that may include a mobile termination (MT) 352 and a DU 354, and the third node 360 may be an IAB node (which also may be referred to as a second IAB node) that may include a mobile termination (MT) 362 and a DU 364. While not shown for simplicity, in some implementations, the second node 350 and the third node 360 may each be a gNB, a CU, a DU, an IAB node, a UE, or a combination of a CU and a DU. Furthermore, while not shown for simplicity, the wireless communication system 300 may include one or more additional BSs, one or more additional UEs, one or more additional IAB donors, and one or more additional IAB nodes.

The first node 330, the second node 350, and the third node 360 may implement a resource management protocol under an IAB framework, as defined by the 3GPP technical specification (TS) and further described herein. The first node 330, the second node 350, and the third node 360 may have a disaggregated architecture, where the second node 350 (such as a first IAB node) and the third node 360 (such as a second IAB node) are wirelessly connected to the first node 330 (such as an IAB donor) to extend the coverage of the wireless communication network 300. For example, the disaggregated architecture may extend the coverage of the wireless communication network 300 into geographic areas that are not feasible or cost effective to have wired connections. In some implementations, gNBs such as the BS 110 typically do not support or implement the resource management protocol under the IAB framework. Thus, gNBs such as the BS 110 also may be referred to as a non-IAB node, as further described herein.

The first node 330 (such as an IAB donor) may function as a parent node to the second node 350 (such as a first IAB node) and the second node 360 (such as a second IAB node) for the resource management protocol under the IAB framework. Under the resource management protocol, an IAB donor may provide resource management information to one or more IAB nodes to configure resources associated with each of the IAB nodes. For example, the first node 330 may provide resource management information to the second node 350 that indicates resource management configurations for the resources associated with the second node 350. The resource management information received by the second node 350 also may include resource management configurations for neighbor nodes (such as the third node 360) and child nodes (such as the UE 120 and the UE 121). The first node 330 also may provide resource management information to the third node 360 that indicates resource management configurations for the resources associated with the third node 360. The resource management information received by the third node 360 also may include resource management configurations for neighbor nodes (such as the second node 350) and child nodes (such as the UE 120 and the UE 121). The resources associated with the second node 350 and the third node 360 may include one or more of time domain resources (such as time slots), frequency domain resources (such as resource blocks (RBs)), and spatial domain resources (such as spatial directions).

Under the resource management protocol associated with the IAB framework, the resource management configurations may include an "unavailable" type of resource management configuration, a "hard" type of resource management configuration, and a "soft" type of resource management configuration. Some critical or time sensitive communications, such as transmission of SSB, PBCH or PDCCH communications and reception of PRACH or SR communications, may be performed even when a resource is configured with a soft type or an unavailable type of resource management configuration. These critical or time sensitive communications may be referred to as exempt communications since they may be exempt from the conditions of the soft type of configuration and the restrictions of the unavailable type of configuration.

In some implementations, the second node 350 (such as an IAB node) and the third node 360 (such as an IAB node) may leverage the resource management protocol under the IAB framework for power savings. For example, the second node 350 may enter a power save mode based on the resource management configurations received from the first node 330 (such as an IAB donor). The second node 350 may save power by reducing the resources (in one or more of the time, frequency, and spatial domains) that are active and communicating during the power save mode. In some implementations, when the first node 330 configures a resource associated with a node (such as the second node 350) with the unavailable type of resource management configuration to cause the second node 350 to not use the resource for transmissions or receptions, the second node 350 may use that period of inactivity configured by the resource management protocol to enter a power save mode to improve power savings, as further described herein.

In some implementations, the first node 330 may provide a first resource management configuration to the second node 350 indicating an unavailable type of configuration for a first resource associated with the second node 350. In order to leverage the resource management protocol under the IAB framework for power savings, the second node 350 may schedule a power save mode for the second node 350 for the first resource that is configured with the unavailable type of configuration. The first resource may be a time domain resource, a frequency domain resource, or a spatial domain resource. If the first resource is a time domain resource, the second node 350 may schedule the power save mode during a time slot associated with the time domain resource. If the first resource is a frequency domain resource, the second node 350 may schedule the power save mode during an RB associated with the frequency domain resource. If the first resource is a spatial domain resource, the second node 350 may schedule the power save mode in a spatial direction associated with the spatial domain resource.

In some implementations, when the second node 350 is a gNB (such as the BS 110) or a non-IAB node, the second node 350 may transmit a capability indication to the first node 330 indicating the second node 350 supports leveraging the resource management configurations under the IAB framework for power savings. The capability indication may indicate the second node 350 (which may be a non-IAB node) supports scheduling a power save mode based on the resource management configurations. For example, when the second node 350 or the BS 110 receives a resource management configuration from the first node 330 indicating an unavailable type of configuration for a first resource, the second node 350 or the BS 110 may schedule a power save mode for the first resource. In some implementations, non-IAB nodes may be configured to implement the hard type of configuration and the unavailable type of configuration under the IAB framework, and the power save mode for the unavailable type of configuration. Similarly, in some implementations, a UE (such as the UE 120) may transmit a capability indication to the second node 350 indicating the UE 120 supports leveraging the resource management configurations under the IAB framework for power savings. For example, when the UE 120 receives a resource management configuration from the second node 350 indicating an unavailable type of configuration for a first resource, the UE 120 may schedule a power save mode for the first resource.

In some implementations, the second node 350 may leverage resource management configurations associated with one or more neighbor nodes that are shared among neighbor nodes to implement coordinated power savings in the wireless communication network 300. The neighbor nodes may be any other type of node, such as another IAB node, a parent node, a child node, a gNB (such as a non-IAB node), a UE, among others. In some implementations, the second node 350 may receive resource management information that includes resource management configurations for one or more resources associated with the second node 350 and resource management configurations associated with one or more neighbor nodes (such as the third node 360 or the first node 330). The second node 350 may schedule a power save mode associated with the resource management configurations for the second node 350 and the resource management configurations for the one or more neighbor nodes. For example, the resource management configurations for the one or more neighbors may include the resource management configurations for the first node 330 (such as a parent node). The resource management configurations associated with the parent node may indicate the parent node may not transmit any communications to the second node 350 during a first time period (such as one or more time slots). The resource management configurations associated with the second node 350 may indicate that a configuration for a second time period (such as one or more time slots) is an unavailable type of configuration for the second node 350. Thus, based on the configurations associated with the second node 350 and the parent node, the second node 350 may schedule a first instance of the power save mode during the first time period and a second instance of the power save mode during the second time period. The second node 350 may enter the power save mode during two separate time intervals to improve power savings by leveraging the resource management information of the second node 350 and of the neighbor nodes.

In some implementations, similarly, as described for the second node 350 (such as an IAB node), gNBs, non-IAB nodes, and UEs may be configured to leverage the resource management configurations shared by neighbor nodes for power savings. For example, a non-IAB node (or a gNB or a UE) may receive resource management information that includes resource management configurations for one or more resources associated with the non-IAB node (or the gNB or the UE, respectively) and resource management configurations associated with one or more neighbor nodes (such as the second node 350). In some implementations, the non-IAB node (or the gNB or the UE) may schedule a power save mode based on the resource management configurations for the non-IAB node (or the gNB or the UE, respectively) and the resource management configurations for the one or more neighbor nodes. For example, the BS 110 (such as a gNB or a non-IAB node) may schedule a power save mode based on the resource management configurations for the BS 110 and the resource management configurations for one or more neighbor nodes (such as the first node 330 and the second node 350).

As described herein, the neighbor nodes that share resource management configurations may include parent and child nodes. In some implementations, the resource management configurations that are shared with the second node 350 may include the resource management configurations for a parent node (such as the first node 330). The resource management configurations associated with the parent node may indicate the parent node may not transmit any communications to the second node 350 during a first resource, such as a first time period (which may include one or more time slots). For example, the parent node may not transmit any communications to the MT 352 of the second node 350 during the first time period. The resource management configurations associated with the second node 350 may indicate that a configuration for the first time period is an unavailable type of configuration for the second node 350. Since the first time period is configured with an unavailable type of configuration, the DU 354 of the second node 350 may not transmit or receiving during the first time period. Based on the configurations associated with the second node 350 and the parent node, the second node 350 may schedule a first instance of the power save mode for the MT 352 during the first time period and a second instance of the power save mode for the DU 354 during the first time period. Thus, instead of simply scheduling a power save mode for part of the second node 350 (such as only the DU 354), the second node 350 may schedule a power save mode for both the DU 354 and the MT 352 by leveraging the shared resource management configurations.

In some implementations, when a child node is a UE (such as UE 120), the UE 120 may use the shared resource management information associated with the second node 350 to obtain, ascertain, select or determine one or more resources when the second node 350 has not scheduled transmissions to the UE 120. For example, the UE 120 may determine the second node 350 has not scheduled transmissions to the UE 120 during even time slots. Thus, the UE 120 may schedule a power save mode during the even time slots.

In some implementations, a parent node (such as the first node 330) may leverage the resource management configurations for one or more of the child nodes (such as the second node 350) for power savings. For example, the first node 330 may adjust the schedule for transmissions with the MT 352 of the second node 350 based on the resource management configurations of the second node 350. If a first resource of the second node 350 is configured with an unavailable type of configuration, the DU 354 of the second node 350 may not transmit or receiving during that first resource. When the second node 350 is configured with the unavailable type of configuration, the first node 330 may adjust the schedule of the transmissions with the MT 352 of the second node 350 to avoid transmitting during the first resource. Thus, the second node 350 may schedule a power save mode for both the MT 352 and the DU 354 during the first resource. For example, the second node 350 may configure the discontinuous reception (DRX) cycles such that the second node 350 can enter a power save mode for both the MT 352 and the DU 354 during the first resource.

In some implementations, a child node (such as the second node 350 or the UE 120) may use the shared resource management information associated with a parent node (such as the first node 330 or the second node 350, respectively) to obtain, ascertain, select or determine one or more RBs when the parent node has not scheduled transmissions to the child node. The child node may autonomously adjust its bandwidth (BW) or bandwidth part (BWP) to schedule a power save mode during the one or more RBs when the parent node has not scheduled transmission to the child node. As another example, depending on the configuration of the parent node, the child node may autonomously adjust the tracking reference signal (TRS) configuration to schedule a power save mode during the one or more RBs.

In some implementations, the second node 350 (such as a first IAB mode) may use shared resource management configurations from the third node 360 (such as a second IAB mode) to ascertain, select or determine whether to extend the node's coverage in a certain spatial direction in order to allow the third node 360 to implement a power save mode. For example, the resource management configuration associated with the third node 360 may indicate that a first spatial resource having a first spatial direction (such a first spatial resource of a first beam having a first spatial direction) may enter a power save mode and stop transmissions and receptions. When the resource management configuration indicates the first spatial resource associated with the third node 360 may enter the power save mode, the second node 350 may extend the node's coverage to the area that typically receives coverage from the third node 360 via the first spatial resource. For example, one of the cells of the second node 350 may extend the coverage in a corresponding spatial direction (such as via a beam having the corresponding spatial direction) that compensates for the reduced spatial coverage of the third node 360. Using the shared resource management configurations to adjust the spatial coverages of neighbor nodes may allow a first neighbor node to enter a power save mode while a second neighbor compensates for the reduced spatial coverage of the first neighbor node.

In some implementations, the second node 350 or the third node 360 may override the exemption of the communications that are exempt from the resource management configurations. In some implementations, nodes (such as the second node 350 and the third node 360) may implement signaling that indicates whether each of the nodes is overriding the exemption of the exempt communications or supports the exemption of the exempt communications. For example, the second node 350 may provide dynamic or semi-static indications that indicate whether the second node 350 is overriding the exemption of the exempt communications or supports the exemption of the exempt communications. In some implementations, the indication may be a single bit of a dynamic or semi-static communication. In some implementations, the indication may be more granular, such as two or more bits, to indicate whether a first subset of the exempt communications are being overridden and a second subset of the exempt communications are not being overridden. For example, a granular indication of two or more bits may indicate that the exemption of a first exempt communication (such as CSI-RSs) is being overridden and the exemption of a second exempt communication (such as SSBs) is not being overridden. When the exemption of exempt communication is overridden, the previously exempt communication may not be transmitted during resources that have an unavailable type of configuration for improved power savings. In some implementations, the second node 350 may provide the semi-static or dynamic indication to the first node 330, or the UE 120, or both. The third node 360 may provide the semi-static or dynamic indication to the first node 330, or the UE 121, or both. In some implementations, the first node 330 may instruct or configure the second node 350 and the third node 360 to override one or more exempt communications. In some implementations, the first node 330 may suggest the second node 350 and the third node 360 to override one or more exempt communications, but the second node 350 and the third node 360 may decide whether or not to implement the suggestion. The second node 350 and the third node 360 may indicate whether or not the suggestion was adopted using the semi-static or dynamic indication that indicates whether the exemption of one or more exempt communications has been overridden.

In some implementations, similar to the indication of whether the exemption of certain exempt communications is being overridden during certain resources, the second node 350 and the third node 360 may indicate whether the exemption of certain exempt communications during guard symbols is being overridden. Typically, most communications are restricted from being transmitted or received during the guard intervals, with the exception of the exempt communication. In some implementations, nodes (such as the second node 350 and the third node 360) may implement signaling that indicates whether each of the nodes is overriding the exemption of the exempt communications or supports the exemption of the exempt communications during the guard symbols. For example, the second node 350 may provide dynamic or semi-static indications that indicate whether the second node 350 is overriding the exemption of the exempt communications or supports the exemption of the exempt communications during the guard symbols.

In some implementations, the semi-static or dynamic indication that indicates whether the second node 350 is overriding the exemption of one or more exempt communications during certain resources or during guard symbols may be shared with neighbor nodes. Sharing both the resource management configurations and the exemption configuration with neighbor nodes may improve the power savings of the neighbor nodes, may help adjust evaluation periods (such as for link and beam management failure and recovery) for the neighbor nodes, may help interference management and mobility management, and may help adjust other communication configurations for coordinated power saving in the wireless communication network 300.

Figure 4:
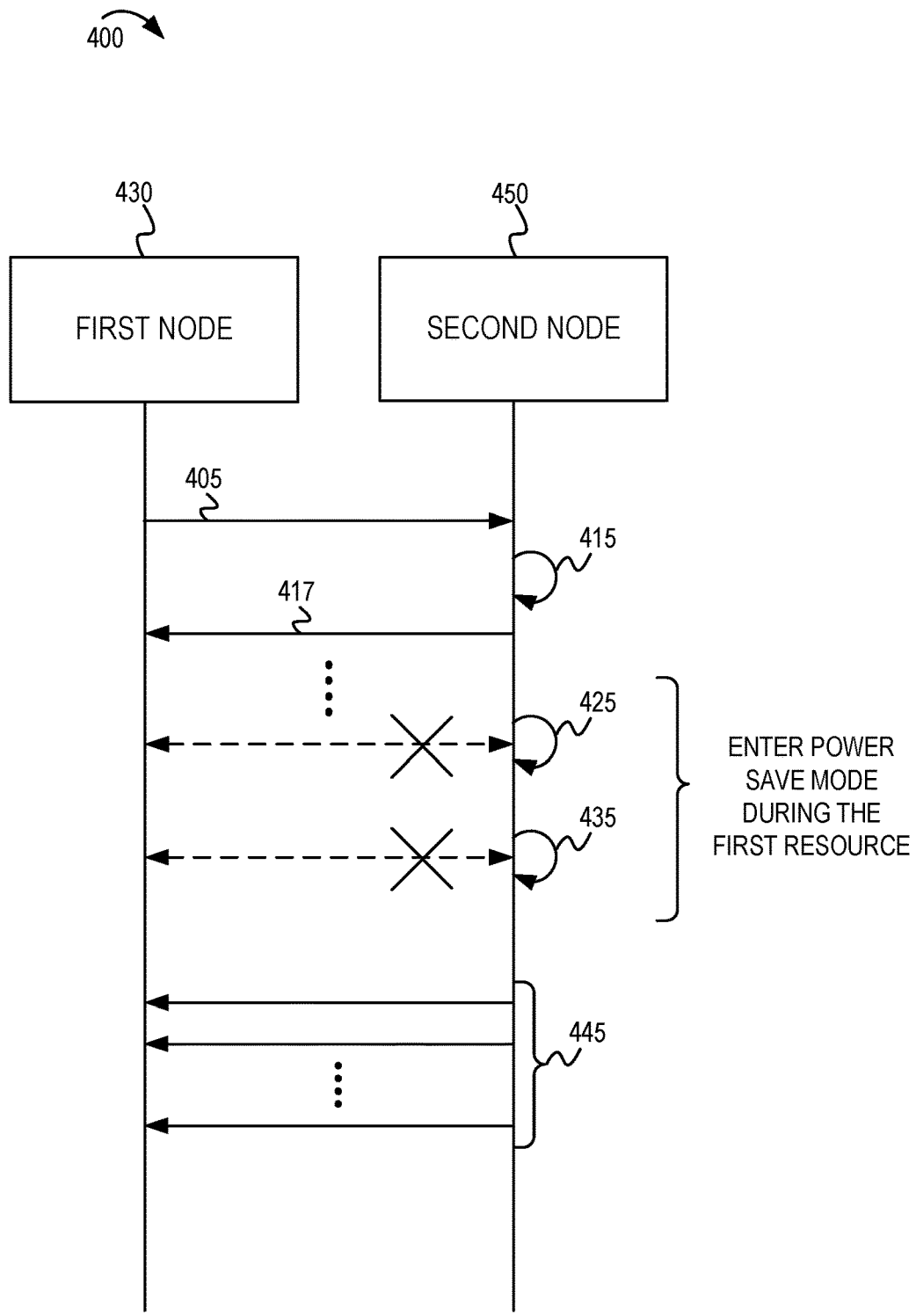
FIG. 4 shows an example message flow between a first node and a second node of a wireless communication network that are configured to leverage resource management configurations under an IAB framework for power savings.

FIG. 4 shows an example message flow between a first node and a second node of a wireless communication network that are configured to leverage resource management configurations under an IAB framework for power savings. The message flow diagram 400 includes network nodes or network entities, such as the first node 430 and the second node 450. In some implementations, the first node 430 may correspond to the first node 330 described in FIG. 3, which may be an IAB donor. The second node 450 may correspond to the second node 350 described in FIG. 3, which may be an IAB node. In some implementations, the first node 430 may be a gNB, a CU, a DU, or an IAB node, and the second node 450 may be a gNB, a CU, a DU, or a UE, as described in FIG. 3.

At 405, the first node 430 may provide resource management information to the second node 450 that indicates resource management configurations for one or more resources of the second node 450. For example, the resource management configurations under an IAB framework may include an unavailable type of resource management configuration, a hard type of resource management configuration, and a soft type of resource management configuration.

At 415, the second node 450 may receive the resource management information from the first node 430. The resource management information may indicate that the resource management configuration for a first resource is of an unavailable type of configuration (which also may be referred to as a first type of configuration). Since the unavailable type of configuration indicates that the second node 450 should not transmit or receive during the first resource, the second node 450 may schedule a power save mode during the first resource. As described in FIG. 3, the first resource may be a time domain resource, a frequency domain resource, or a spatial domain resource.

At 417, the second node 450 may provide an indication to the first node 430 that indicates whether communications that are exempt from the restrictions of an unavailable type of configuration will be allowed while the second node 450 is in a power save mode during the first resource. For example, the indication may be a semi-static or a dynamic indication that indicates whether the second node 450 is overriding the exemption of the exempt communications or supports the exemption of the exempt communications, as described in FIG. 3. In some implementations, the second node 450 may provide an indication to the first node 430 that indicates exempt communications are restricted during one or more resources including the first resource and exempt communications are supported during one or more additional resources. In some implementations, the second node 450 may receive a resource management configuration from the first node 430 indicating whether the second node 450 should restrict or support exempt communications during the resources. The exempt communications may include transmissions of SSB or PBCH block communications, transmission of certain PDCCH communications, transmission of CSI-RSs, or reception of PRACH or SR communications.

At 425, the second node 450 may initiate a power save mode during the first resource. Since the second node 450 scheduled the power save mode during the first resource, the second node 450 may have rescheduled, cancelled, or queued any transmissions or receptions with the first node 450 or with a child node (such as child IAB node or a UE) during the first resource. For example, the second node 450 may reschedule transmissions and receptions to one or more resource prior to or after the power save mode.

At 435, if the second node 450 provided an indication to the first node 430 that indicated exempt communications will not be allowed while the second node 450 is in a power save mode during the first resource, the second node 450 may restrict, reschedule or delay the transmission or reception of the exemption communications.

At 445, after the power save mode, the second node 450 may perform transmissions or receptions during one or more resource that do not have the unavailable type of configuration. For example, the second node 450 may perform transmission and receptions with the first node 430 during one or more resources that have the hard type or the soft type of configuration under the IAB framework.

FIG. 5 shows an example message flow between a first node, a second node, and a UE of a wireless communication network that are configured to leverage resource management configurations under an IAB framework for power savings. The message flow diagram 500 includes network nodes or network entities, such as a first node 430, a second node 450, and a UE 520. In some implementations, the first node 430 may correspond to the first node 330 described in FIG. 3, which may be an IAB donor. The second node 450 may correspond to the second node 350 described in FIG. 3, which may be an IAB node. In some implementations, the second node 450 may include an MT 552 and a DU 554. In some implementations, the first node 430 may be a gNB, a CU, a DU, or an IAB node, and the second node 450 may be a gNB, a CU, a DU, or a UE, as described in FIG. 3.

At 505, the first node 430 may provide resource management information to the second node 450 that indicates resource management configurations for one or more resources of the second node 450. For example, the resource management configurations under an IAB framework may include an unavailable type of resource management configuration, a hard type of resource management configuration, and a soft type of resource management configuration. In some implementations, the first node 430 also may provide resource management configurations to the UE 520.

At 511 and 513, the first node 430, the second node 450, and the UE 520 may share resource management configuration with their neighbor nodes. For example, the second node 450 may share the resource management configuration associated with the second node 450 with the first node 430 and the UE 520. The first node 430 may share the resource management configuration associated with the first node 430 with the second node 450. The UE 520 may share the resource management configuration associated with the UE 520 with the second node 450.

At 515, the second node 450 may receive the resource management information from the first node 430 and the shared resource management configurations from the first node 430 and the UE 520. The resource management information may indicate that the resource management configuration for a first resource is of an unavailable type of configuration (which also may be referred to as a first type of configuration). The shared resource management configuration from the first node 430 may indicate that the first node 430 will not transmit any communications to the second node 450 during the first resource. As described in FIG. 3, the first resource may be a time domain resource, a frequency domain resource, or a spatial domain resource. Since the unavailable type of configuration indicates that the second node 450 should not transmit or receive during the first resource, the second node 450 may schedule a power save mode for the DU 554 during the first resource. Also, since the shared resource management configuration from the first node 430 indicates that the first node 430 will not transmit communications to the second node 450 during the first resource, the second node 450 may schedule a power save mode for the MT 552 during the first resource. Thus, both of the main components of the second node 450 (both the MT 552 and the DU 554) may enter the power save mode during the first resource for maximum power savings. Otherwise, if the shared resource management configuration from the first node 430 indicated that the first node 430 will transmit communications to the MT 552 of the second node 450 during the first resource (not shown), the second node 450 may schedule the power save mode for the DU 554, but not for the MT 552.

At 517, the second node 450 may provide an indication to the first node 430 that indicates whether communications that are exempt from the restrictions of an unavailable type of configuration will be allowed while the second node 450 is in a power save mode during the first resource. For example, the indication may be a semi-static or a dynamic indication that indicates whether the second node 450 is overriding the exemption of the exempt communications or supports the exemption of the exempt communications, as described in FIG. 3. The exempt communications may include transmissions of SSB or PBCH block communications, transmission of certain PDCCH communications, transmission of CSI-RSs, or reception of PRACH or SR communications.

At 525, the second node 450 may initiate a power save mode for the MT 552 and the DU 554 during the first resource. Since the second node 450 scheduled the power save mode during the first resource, the MT 552 and the DU 554 may have rescheduled, cancelled, or queued any transmissions or receptions with the first node 450 or with a child node (such as child IAB node or a UE) during the first resource. For example, the MT 552 and the DU 554 of the second node 450 may reschedule transmissions and receptions to one or more resource prior to or after the power save mode.

At 535, if the second node 450 provided an indication to the first node 430 that indicated exempt communications will not be allowed while the second node 450 is in a power save mode during the first resource, the MT 552 and the DU 554 of the second node 450 may restrict, reschedule or delay the transmission or reception of the exemption communications.

At 545, after the power save mode, the MT 552 and the DU 554 of the second node 450 may perform transmissions or receptions during one or more resource that do not have the unavailable type of configuration. For example, the MT 552 may perform transmission and receptions with the first node 430 during one or more resources that have the hard type or the soft type of configuration under the IAB framework, and the DU 554 may perform transmission and receptions with the UE 520 during one or more resources that have the hard type or the soft type of configuration under the IAB framework.

FIG. 6 shows an example message flow between an IAB node and a non-IAB node of a wireless communication network that are configured to leverage resource management configurations under an IAB framework for power savings. The message flow diagram 600 includes network nodes or network entities, such as an IAB node 655 and a non-IAB node 675. In some implementations, the IAB node 655 may correspond to the first node 330 (such as an IAB donor) or the second node 350 (such as an IAB node) described in FIG. 3. The non-IAB node 675 may correspond to a node that typically does not support a resource management protocol under an IAB framework, such as the gNB 110 described in FIG. 3.

At 605, the non-IAB node 675 may transmit a capability indication to the IAB node 655 indicating the non-IAB node 675 supports leveraging the resource management protocol under the IAB framework for power savings. For example, the capabilities indication may be one or more bits in a message that is transmitted to the IAB node 655.

At 615, the IAB node 655 may receive the capability indication from the non-IAB node 675 indicating the non-IAB node 675 supports leveraging the resource management protocol under the IAB framework for power savings.

At 625, after receiving the capability indication, the IAB node 655 may provide resource management information to the non-IAB node 675 that indicates resource management configurations for one or more resources of the non-IAB node 675. For example, the resource management configurations under an IAB framework may include an unavailable type of resource management configuration or a hard type of resource management configuration.

At 635, the non-IAB node 675 may receive the resource management information from the IAB node 655. The resource management information may indicate that the resource management configuration for a first resource is of an unavailable type of configuration (which also may be referred to as a first type of configuration). Since the unavailable type of configuration indicates that the non-IAB node 675 should not transmit or receive during the first resource, the non-IAB node 675 may schedule a power save mode during the first resource. As described in FIG. 3, the first resource may be a time domain resource, a frequency domain resource, or a spatial domain resource.

At 645, the non-IAB node 675 may initiate a power save mode during the first resource. Since the non-IAB node 675 scheduled the power save mode during the first resource, the non-IAB node 675 may have rescheduled, cancelled, or queued any transmissions or receptions that were originally scheduled during the first resource. For example, the non-IAB node 675 may reschedule transmissions and receptions to one or more resource prior to or after the power save mode.

At 650, after the power save mode, the non-IAB node 675 may perform transmissions or receptions during one or more resource that do not have the unavailable type of configuration. For example, the non-IAB node 675 may perform transmission and receptions with the IAB node 655 (or with other nodes) during one or more resources that have the hard type or the soft type of configuration under the IAB framework.

FIG. 7 depicts a flowchart 700 with example operations performed by a first node of a wireless communication network to leverage resource management configurations under an IAB framework for power savings. In some implementations, the first node may be an IAB node (such as the IAB nodes described in FIGS. 3-6) and the second node may be an IAB donor (such as the IAB donor described in FIGS. 3-6). In some implementations, the IAB node may include an MT and a DU, and the IAB donor may include a CU and a DU.

At block 710, a first node may receive, from a second node of a wireless communication network, resource management information for one or more resources associated with the first node. The resource management information may indicate a first resource management configuration for a first resource of the one or more resources.

At block 720, the first node may schedule a power save mode for the first node associated with the first resource and the first resource management configuration.

In some implementations, the first node may receive resource management configurations for one or more additional nodes. The first node may schedule the power save mode for the first node associated with the first resource, the first resource management configuration, and the resource management configurations for the one or more additional nodes. In some implementations, the first node may schedule a first instance of the power save mode for the first node associated with the first resource and the first resource management configuration, and schedule a second instance of the power save mode for the first node associated with the resource management configurations for the one or more additional nodes.

In some implementations, the first node may receive a second resource management configuration for the first resource associated with a parent node of the first node. The first node may schedule a first instance of the power save mode for the first node associated with the first resource and the first resource management configuration, and schedule a second instance of the power save mode for the first node associated with the first resource and the second resource management configuration.

Figure 8:
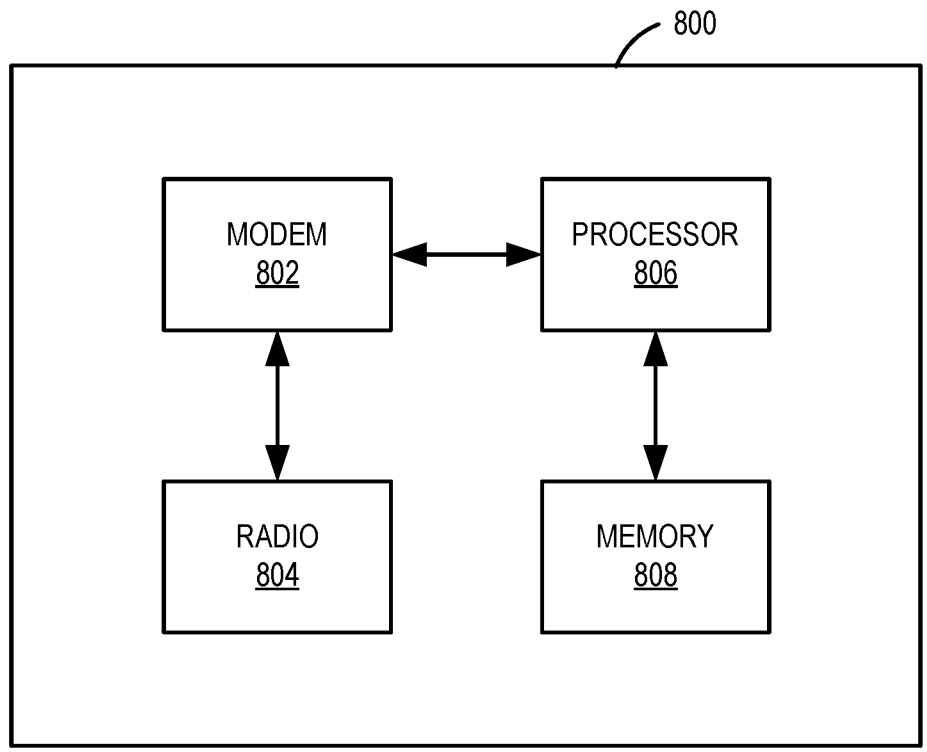
FIG. 8 shows a block diagram of an example wireless communication apparatus.

FIG. 8 shows a block diagram of an example wireless communication apparatus 800. In some implementations, the wireless communication apparatus 800 can be an example of a device for use in a UE, such as the UE 120 described with reference to FIG. 3. In some implementations, the wireless communication apparatus 800 can be an example of a device for use in one or more of a BS, an IAB node, an IAB donor, a DU, an MT, or a CU, such as the BS 110, the first node 330, the second node 350, the third node 360, the CU 332, the DU 334, the MT 352, the DU 354, the MT 362, and the DU 364 described with reference to FIG. 3. The wireless communication apparatus 800 is capable of transmitting (or outputting for transmission) and receiving wireless communications.

The wireless communication apparatus 800 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication apparatus 800 may include one or more modems 802. In some implementations, the one or more modems 802 (collectively "the modem 802") may include a WWAN modem (for example, a 3GPP 4G LTE or 5G compliant modem). In some implementations, the wireless communication apparatus 800 also includes one or more radios 804 (collectively "the radio 804"). In some implementations, the wireless communication apparatus 800 further includes one or more processors, processing blocks or processing elements (collectively "the processor 806") and one or more memory blocks or elements (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are mapped to points in a modulation constellation (using a selected MCS) to provide modulated symbols. The modulated symbols may be mapped to a number NS S of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 806) for processing, evaluation, or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication apparatus 800 can include, or be coupled with, multiple transmit antennas (each with a corresponding transmit chain) and multiple receive antennas (each with a corresponding receive chain). The symbols output from the modem 802 are provided to the radio 804, which transmits the symbols via the coupled antennas. Similarly, symbols received via the antennas are obtained by the radio 804, which provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. In some implementations, the processor 806 may generally control the modem 802 to cause the modem to perform various operations described throughout.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the processor 806 and the memory 808 of the wireless communication apparatus 800 may be referred to as a processing system. A processing system may generally refer to a system or series of machines or components that receives inputs and processes the inputs to produce a set of outputs (which may be passed to other systems or components of, for example, one of the UEs 120 or one of the BSs 110). In some implementations, the processing system may include the processor 806, the memory 808, and one or more other components of the wireless communication apparatus 800, such as the modem 802.

In some implementations, the processing system of a UE 120 may interface with other components of the UE 120, and may process information received from other components (such as inputs or signals), output information to other components, etc. For example, a chip or modem of the UE 120 (such as the wireless communication apparatus 800) may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the processing system of a BS 110 may interface with other components of the BS 110, and may process information received from other components (such as inputs or signals), output information to other components, etc. For example, a chip or modem of the BS 110 (such as the wireless communication apparatus 800) may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Figure 9:
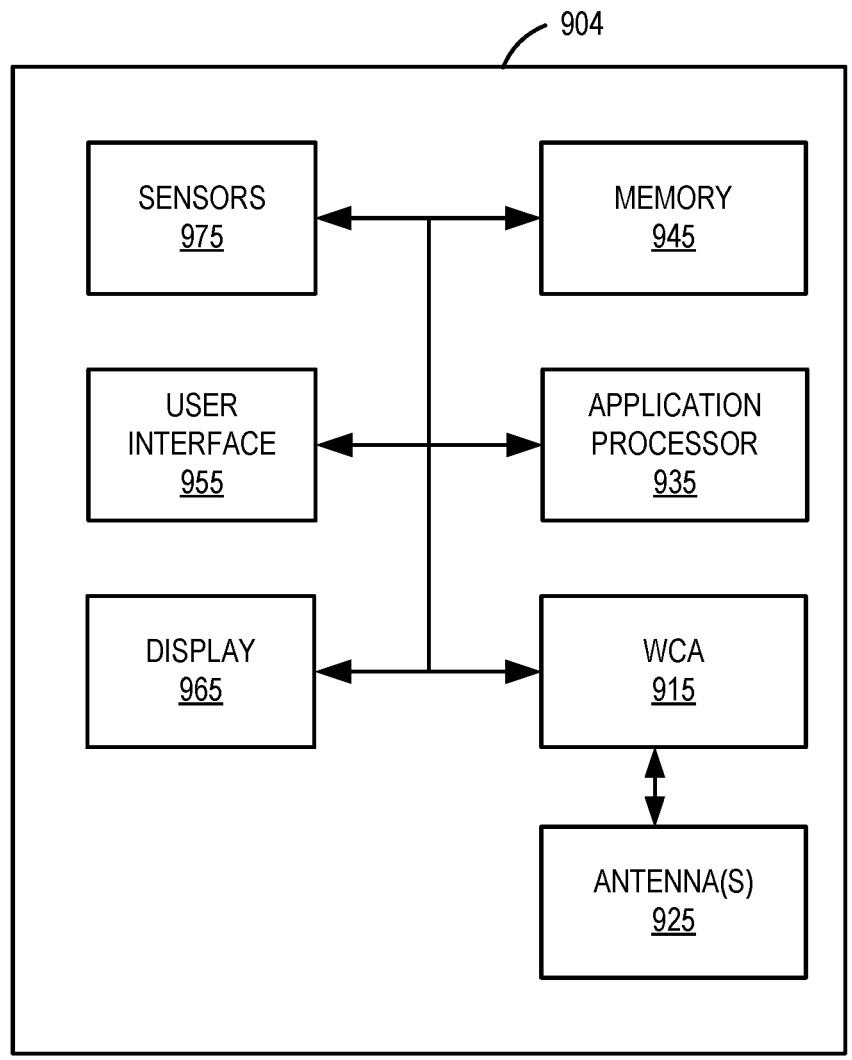
FIG. 9 shows a block diagram of an example mobile communication device.

FIG. 9 shows a block diagram of an example mobile communication device 904. For example, the mobile communication device 904 can be an example implementation of the UE 120 described herein. The mobile communication device 904 includes a wireless communication apparatus (WCA) 915. For example, the WCA 915 may be an example implementation of the wireless communication apparatus 800 described with reference to FIG. 8. The mobile communication device 904 also includes one or more antennas 925 coupled with the WCA 915 to transmit and receive wireless communications. The mobile communication device 904 additionally includes an application processor 935 coupled with the WCA 915, and a memory 945 coupled with the application processor 935. In some implementations, the mobile communication device 904 further includes a UI 955 (such as a touchscreen or keypad) and a display 965, which may be integrated with the UI 955 to form a touchscreen display. In some implementations, the mobile communication device 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The mobile communication device 904 further includes a housing that encompasses the WCA 915, the application processor 935, the memory 945, and at least portions of the antennas 925, UI 955, and display 965.

FIGS. 1-9 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One aspect of the subject matter described in this disclosure can be implemented in a method performed by a first node of a wireless communication network. The method may include receiving, from a second node of the wireless communication network, resource management information for one or more resources associated with the first node. The resource management information may indicate a first resource management configuration for a first resource of the one or more resources. The method may include scheduling a power save mode for the first node associated with the first resource and the first resource management configuration.

Clause 2. The method of clause 1, where the first node may be a first IAB node, a first gNB, a first CU, a first DU, a child IAB node, or a UE, and the second node may be a second IAB node, an IAB donor, a second gNB, a second CU, a second DU, or a parent IAB node.

Clause 3. The method of any one or more of clauses 1-2, where the resource management information may be resource management information under an IAB framework, and the first resource management configuration may be a first resource management configuration under the IAB framework. The first resource management configuration may indicate an unavailable type of resource management configuration for the first resource.

Clause 4. The method of any one or more of clauses 1-3, where the first resource may be a time domain resource, a frequency domain resource, or a spatial domain resource.

Clause 5. The method of any one or more of clauses 1-4, where, if the first resource is a time domain resource, the method of scheduling the power save mode for the first node associated with the first resource and the first resource management configuration may include scheduling the power save mode associated with the first resource management configuration during a first time slot associated with the time domain resource. If the first resource is a frequency domain resource, the method of scheduling the power save mode for the first node associated with the first resource and the first resource management configuration may include scheduling the power save mode associated with the first resource management configuration during a first RB associated with the frequency domain resource. If the first resource is a spatial domain resource, the method of scheduling the power save mode for the first node associated with the first resource and the first resource management configuration may include scheduling the power save mode associated with the first resource management configuration in a first spatial direction associated with the spatial domain resource.

Clause 6. The method of any one or more of clauses 1-5, where the method may further include transmitting a capability indication to the second node indicating the first node supports resource management configurations under an IAB framework and supports a power save mode associated with the first resource management configuration.

Clause 7. The method of any one or more of clauses 1-6, where the method may further include receiving resource management configurations for one or more additional nodes of the wireless communication network, and scheduling the power save mode for the first node associated with the first resource, the first resource management configuration, and the resource management configurations for the one or more additional nodes.

Clause 8. The method of any one or more of clauses 1-7, where the method of scheduling the power save mode for the first node associated with the first resource, the first resource management configuration, and the resource management configurations for the one or more additional nodes may further include scheduling a first instance of the power save mode for the first node associated with the first resource and the first resource management configuration, and scheduling a second instance of the power save mode for the first node associated with the resource management configurations for the one or more additional nodes.

Clause 9. The method of any one or more of clauses 1-8, where the method may further include receiving a second resource management configuration for the first resource associated with a parent node of the first node, scheduling a first instance of the power save mode for the first node associated with the first resource and the first resource management configuration, and scheduling a second instance of the power save mode for the first node associated with the first resource and the second resource management configuration.

Clause 10. The method of any one or more of clauses 1-9, where the first node may be an IAB node, and the IAB node may include an MT and a DU. The method of scheduling the first instance of the power save mode may include scheduling the first instance of the power save mode for the first resource associated with the DU of the IAB node and the first resource management configuration, and the method of scheduling a second instance of the power save mode may include scheduling the second instance of the power save mode for the first resource associated with the MT of the IAB node and the second resource management configuration.

Clause 11. The method of any one or more of clauses 1-10, where the method may further include transmitting, to the second node, an indication that exempt communications are restricted during one or more resources associated with the first node including the first resource, and that exempt communications are supported during one or more additional resources associated with the first node.

Clause 12. The method of any one or more of clauses 1-11, where the method may further include restricting exempt communications during the first resource when the first node is in the power save mode.

Clause 13. The method of any one or more of clauses 1-12, where the method may further include receiving, from the second node, a second resource management configuration indicating whether the first node should support exempt communications in the one or more resources associated with the first node, the second node being a parent node of the first node.

Clause 14. Another aspect of the subject matter described in this disclosure can be implemented in a first node of a wireless communication network. The first node may include one or more processors and one or more interfaces. The one or more interfaces may be configured to receive resource management information for one or more resources associated with the first node. The resource management information may indicate a first resource management configuration for a first resource of the one or more resources. The one or more processors may be configured to schedule a power save mode for the first node associated with the first resource and the first resource management configuration.

Clause 15. The first node of clause 14, where, if the first resource is a time domain resource, the one or more processors may be configured to schedule the power save mode associated with the first resource management configuration during a first time slot associated with the time domain resource. If the first resource is a frequency domain resource, the one or more processors may be configured to schedule the power save mode associated with the first resource management configuration during a first RB associated with the frequency domain resource. If the first resource is a spatial domain resource, the one or more processors may be configured to schedule the power save mode associated with the first resource management configuration in a first spatial direction associated with the spatial domain resource.

Clause 16. The first node of any one or more of clauses 14-15, where the one or more interfaces may be further configured to transmit a capability indication to a second node indicating the first node supports resource management configurations under an IAB framework and supports a power save mode associated with the first resource management configuration.

Clause 17. The first node of any one or more of clauses 14-16, where the one or more interfaces may be configured to receive resource management configurations for one or more additional nodes of the wireless communication network, and the one or more processors may be configured to schedule the power save mode for the first node associated with the first resource, the first resource management configuration, and the resource management configurations for the one or more additional nodes.

Clause 18. The first node of any one or more of clauses 14-17, where the one or more interfaces may be configured to receive a second resource management configuration for the first resource associated with a parent node of the first node. The one or more processors may be configured to schedule a first instance of the power save mode for the first node associated with the first resource and the first resource management configuration. The one or more processors may be configured to schedule a second instance of the power save mode for the first node associated with the first resource and the second resource management configuration.

Clause 19. The first node of any one or more of clauses 14-18, where the first node may be an IAB node, and the IAB node may include an MT and a DU. The one or more processors configured to schedule the first instance of the power save mode may include the one or more processors configured to schedule the first instance of the power save mode for the first resource associated with the DU of the IAB node and the first resource management configuration. The one or more processors configured to schedule a second instance of the power save mode may include the one or more processors configured to schedule the second instance of the power save mode for the first resource associated with the MT of the IAB node and the second resource management configuration.

Clause 20. Another aspect of the subject matter described in this disclosure can be implemented in a non-transitory computer-readable medium having stored therein instructions which, when executed by a processor of a first node, cause the first node to receive, from a second node of a wireless communication network, resource management information for one or more resources associated with the first node, the resource management information indicating a first resource management configuration for a first resource of the one or more resources, and schedule a power save mode for the first node associated with the first resource and the first resource management configuration.

Clause 21. The non-transitory computer-readable medium of clause 20, where the instructions, when executed by the processor of the first node, cause the first node to, if the first resource is a time domain resource, schedule the power save mode associated with the first resource management configuration during a first time slot associated with the time domain resource. The instructions, when executed by the processor of the first node, cause the first node to, if the first resource is a frequency domain resource, schedule the power save mode associated with the first resource management configuration during a first RB associated with the frequency domain resource. The instructions, when executed by the processor of the first node, cause the first node to, if the first resource is a spatial domain resource, schedule the power save mode associated with the first resource management configuration in a first spatial direction associated with the spatial domain resource.

Clause 22. The non-transitory computer-readable medium of any one or more of clauses 20-21, where the instructions, when executed by the processor of the first node, cause the first node to transmit a capability indication to the second node indicating the first node supports resource management configurations under an IAB framework and supports a power save mode associated with the first resource management configuration.

Clause 23. Another aspect of the subject matter described in this disclosure can be implemented in a first node of a wireless communication network. The first node may include means for receiving, from a second node of the wireless communication network, resource management information for one or more resources associated with the first node. The resource management information may indicate a first resource management configuration for a first resource of the one or more resources. The first node may include means for scheduling a power save mode for the first node associated with the first resource and the first resource management configuration.

Clause 24. The first node of clause 23, where the means for scheduling the power save mode for the first node associated with the first resource and the first resource management configuration may include, if the first resource is a time domain resource, means for scheduling the power save mode associated with the first resource management configuration during a first time slot associated with the time domain resource. The means for scheduling the power save mode for the first node associated with the first resource and the first resource management configuration may include, if the first resource is a frequency domain resource, means for scheduling the power save mode associated with the first resource management configuration during a first RB associated with the frequency domain resource. The means for scheduling the power save mode for the first node associated with the first resource and the first resource management configuration may include, if the first resource is a spatial domain resource, means for scheduling the power save mode associated with the first resource management configuration in a first spatial direction associated with the spatial domain resource.

Clause 25. The first node of any one or more of clauses 23-24, further including means for transmitting a capability indication to the second node indicating the first node supports resource management configurations under an IAB framework and supports a power save mode associated with the first resource management configuration.

Another aspect of the subject matter described in this disclosure can be implemented as a non-transitory computer-readable medium having stored therein instructions which, when executed by one or more processors of a first node, cause the first node to perform any one of the above-mentioned methods or features described herein.

Another aspect of the subject matter described in this disclosure can be implemented as an apparatus having means for implementing any one of the above-mentioned methods or features described herein.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication performed by a first node of a wireless communication network, comprising:
    transmitting a capability indication to a second node indicating the first node supports resource management configurations under an integrated access and backhaul (IAB) framework and supports a power save mode associated with a first resource management configuration;
    receiving, from the second node of the wireless communication network, resource management information for one or more resources associated with the first node, the resource management information indicating the first resource management configuration for a first resource of the one or more resources; and
    scheduling the first node to enter the power save mode associated with the first resource and the first resource management configuration, wherein the power save mode is associated with the first node stopping transmissions and receptions during the first resource.

2. The method of claim 1, wherein:
    the first node is a first IAB node, a first Next Generation NodeB (gNB), a first central unit (CU), a first distributed unit (DU), a child IAB node, or a user equipment (UE), and
    the second node is a second IAB node, an IAB donor, a second gNB, a second CU, a second DU, or a parent IAB node.

3. The method of claim 1, wherein the resource management information is the resource management information under the IAB framework, and the first resource management configuration is a first resource management configuration under the IAB framework, the first resource management configuration indicating an unavailable type of resource management configuration for the first resource.

4. The method of claim 1, wherein the first resource is a time domain resource, a frequency domain resource, or a spatial domain resource.

5. The method of claim 1, wherein:
    based at least in part on the first resource being a time domain resource, scheduling the power save mode for the first node associated with the first resource and the first resource management configuration includes scheduling the power save mode associated with the first resource management configuration during a first time slot associated with the time domain resource;
    based at least in part on the first resource being a frequency domain resource, scheduling the power save mode for the first node associated with the first resource and the first resource management configuration includes scheduling the power save mode associated with the first resource management configuration during a first resource block (RB) associated with the frequency domain resource; or based at least in part on the first resource being a spatial domain resource, scheduling the power save mode for the first node associated with the first resource and the first resource management configuration includes scheduling the power save mode associated with the first resource management configuration in a first spatial direction associated with the spatial domain resource.

6. The method of claim 1, further comprising:
receiving resource management configurations for one or more additional nodes of the wireless communication network; and
scheduling the power save mode for the first node associated with the first resource, the first resource management configuration, and the resource management configurations for the one or more additional nodes.

7. The method of claim 6, wherein scheduling the power save mode for the first node associated with the first resource, the first resource management configuration, and the resource management configurations for the one or more additional nodes includes:
scheduling a first instance of the power save mode for the first node associated with the first resource and the first resource management configuration; and
scheduling a second instance of the power save mode for the first node associated with the resource management configurations for the one or more additional nodes.

8. The method of claim 1, further comprising:
receiving a second resource management configuration for the first resource associated with a parent node of the first node;
scheduling a first instance of the power save mode for the first node associated with the first resource and the first resource management configuration; and
scheduling a second instance of the power save mode for the first node associated with the first resource and the second resource management configuration.

9. The method of claim 8, wherein the first node is an IAB node, the IAB node including a mobile termination (MT) and a distributed unit (DU), wherein:
scheduling the first instance of the power save mode includes scheduling the first instance of the power save mode for the first resource associated with the DU of the IAB node and the first resource management configuration; and
scheduling the second instance of the power save mode includes scheduling the second instance of the power save mode for the first resource associated with the MT of the IAB node and the second resource management configuration.

10. The method of claim 1, further comprising:
transmitting, to the second node, an indication that exempt communications are restricted during the one or more resources associated with the first node including the first resource, and that exempt communications are supported during one or more additional resources associated with the first node.

11. The method of claim 10, further comprising:
restricting the exempt communications during the first resource based at least in part on the first node being in the power save mode.

12. The method of claim 1, further comprising:
receiving, from the second node, a second resource management configuration indicating whether the first node should support exempt communications in the one or more resources associated with the first node, the second node being a parent node of the first node.

13. A first node of a wireless communication network, comprising:
one or more interfaces to transmit a capability indication to a second node indicating the first node supports resource management configurations under an integrated access and backhaul (IAB) framework and supports a power save mode associated with a first resource management configuration;
one or more interfaces configured to receive resource management information for one or more resources associated with the first node, the resource management information indicating the first resource management configuration for a first resource of the one or more resources; and
one or more processors configured to schedule the first node to enter the power save mode associated with the first resource and the first resource management configuration, wherein the power save mode is associated with the one or more processors of the first node stopping transmissions and receptions during the first resource.

14. The first node of claim 13, wherein:
the first node is a first LAB (IAB) node, a first Next Generation NodeB (gNB), a first central unit (CU), a first distributed unit (DU), a child IAB node, or a user equipment (UE), and
the second node is a second IAB node, an IAB donor, a second gNB, a second CU, a second DU, or a parent IAB node.

15. The first node of claim 13, wherein the resource management information is the resource management information under the IAB framework, and the first resource management configuration is a first resource management configuration under the IAB framework, the first resource management configuration indicating an unavailable type of resource management configuration for the first resource.

16. The first node of claim 13, wherein the first resource is a time domain resource, a frequency domain resource, or a spatial domain resource.

17. The first node of claim 13, wherein:
if the first resource is a time domain resource, the one or more processors are configured to schedule the power save mode associated with the first resource management configuration during a first time slot associated with the time domain resource;
if the first resource is a frequency domain resource, the one or more processors are configured to schedule the power save mode associated with the first resource management configuration during a first resource block (RB) associated with the frequency domain resource; or
if the first resource is a spatial domain resource, the one or more processors are configured to schedule the power save mode associated with the first resource management configuration in a first spatial direction associated with the spatial domain resource.

18. The first node of claim 13, wherein:
the one or more interfaces are configured to receive resource management configurations for one or more additional nodes of the wireless communication network; and the one or more processors are configured to schedule the power save mode for the first node associated with the first resource, the first resource management configuration, and the resource management configurations for the one or more additional nodes.

19. The first node of claim 13, wherein:
the one or more interfaces are configured to receive a second resource management configuration for the first resource associated with a parent node of the first node;
the one or more processors are configured to schedule a first instance of the power save mode for the first node associated with the first resource and the first resource management configuration; and
the one or more processors are configured to schedule a second instance of the power save mode for the first node associated with the first resource and the second resource management configuration.

20. The first node of claim 19, wherein the first node is an IAB node, the IAB node including a mobile termination (MT) and a distributed unit (DU), wherein:
the one or more processors configured to schedule the first instance of the power save mode includes the one or more processors configured to schedule the first instance of the power save mode for the first resource associated with the DU of the IAB node and the first resource management configuration; and
the one or more processors configured to schedule the second instance of the power save mode includes the one or more processors configured to schedule the second instance of the power save mode for the first resource associated with the MT of the IAB node and the second resource management configuration.

21. A non-transitory computer-readable medium having stored therein instructions which, when executed by a processor of a first node, cause the first node to:
transmit a capability indication to a second node indicating the first node supports resource management configurations under an integrated access and backhaul (IAB) framework and supports a power save mode associated with a first resource management configuration;
receive, from the second node of a wireless communication network, resource management information for one or more resources associated with the first node, the resource management information indicating the first resource management configuration for a first resource of the one or more resources; and
schedule the first node to enter the power save mode associated with the first resource and the first resource management configuration, wherein the power save mode is associated with the first node stopping transmissions and receptions during the first resource.

22. The non-transitory computer-readable medium of claim 21, wherein the resource management information is the resource management information under the IAB framework, and the first resource management configuration is a first resource management configuration under the IAB framework, the first resource management configuration indicating an unavailable type of resource management configuration for the first resource.

23. The non-transitory computer-readable medium of claim 21, wherein the instructions, when executed by the processor of the first node, cause the first node to:
if the first resource is a time domain resource, schedule the power save mode associated with the first resource management configuration during a first time slot associated with the time domain resource;
if the first resource is a frequency domain resource, schedule the power save mode associated with the first resource management configuration during a first resource block (RB) associated with the frequency domain resource; or
if the first resource is a spatial domain resource, schedule the power save mode associated with the first resource management configuration in a first spatial direction associated with the spatial domain resource.

24. A first node of a wireless communication network, comprising:
means for transmitting a capability indication to a second node indicating the first node supports resource management configurations under an integrated access and backhaul (IAB) framework and supports a power save mode associated with a first resource management configuration;
means for receiving, from the second node of the wireless communication network, resource management information for one or more resources associated with the first node, the resource management information indicating the first resource management configuration for a first resource of the one or more resources; and
means for scheduling the first node to enter the power save mode associated with the first resource and the first resource management configuration, wherein the power save mode is associated with the first node stopping transmissions and receptions during the first resource.

25. The first node of claim 24, wherein the resource management information is the resource management information under the IAB framework, and the first resource management configuration is a first resource management configuration under the IAB framework, the first resource management configuration indicating an unavailable type of resource management configuration for the first resource.

26. The first node of claim 24, wherein means for scheduling the power save mode for the first node associated with the first resource and the first resource management configuration includes:
if the first resource is a time domain resource, means for scheduling the power save mode associated with the first resource management configuration during a first time slot associated with the time domain resource;
if the first resource is a frequency domain resource, means for scheduling the power save mode associated with the first resource management configuration during a first resource block (RB) associated with the frequency domain resource; or
if the first resource is a spatial domain resource, means for scheduling the power save mode associated with the first resource management configuration in a first spatial direction associated with the spatial domain resource.

* * * * *